US011534280B2

(12) United States Patent
Wang

(10) Patent No.: US 11,534,280 B2
(45) Date of Patent: Dec. 27, 2022

(54) DENTAL FLOSS HOLDER AND FLOSSER

(71) Applicant: Jie Wang, Potomac, MD (US)

(72) Inventor: Jie Wang, Potomac, MD (US)

(*) Notice: Subject to any disclaimer, the term of this patent is extended or adjusted under 35 U.S.C. 154(b) by 413 days.

(21) Appl. No.: 16/803,645

(22) Filed: Feb. 27, 2020

(65) Prior Publication Data

US 2020/0268489 A1 Aug. 27, 2020

Related U.S. Application Data

(60) Provisional application No. 62/811,084, filed on Feb. 27, 2019.

(51) Int. Cl.
*A61C 15/00* (2006.01)
*A61C 15/04* (2006.01)
*A61C 15/02* (2006.01)

(52) U.S. Cl.
CPC ............ *A61C 15/046* (2013.01); *A61C 15/02* (2013.01); *A61C 15/043* (2013.01); *A61C 15/045* (2013.01)

(58) Field of Classification Search
CPC ... A61C 15/043; A61C 15/046; A61C 15/045; A61C 15/02
See application file for complete search history.

(56) References Cited

U.S. PATENT DOCUMENTS

| | | | |
|---|---|---|---|
| 3,886,956 A | 6/1975 | Cash | |
| 6,076,535 A | 6/2000 | Yipp | |
| 6,474,347 B1 | 11/2002 | Halinder et al. | |
| 7,159,596 B2 | 1/2007 | Chen | |
| 7,305,997 B2 | 12/2007 | Liu et al. | |
| 7,467,631 B2 | 12/2008 | Bergman et al. | |
| D617,953 S | 6/2010 | Sederquist | |
| 8,104,487 B2 | 1/2012 | Hardy | |
| 10,034,729 B2 | 7/2018 | Kozak | |
| 2008/0289648 A1* | 11/2008 | Liu | A61C 15/046 132/325 |
| 2011/0132392 A1* | 6/2011 | Crisp | A46B 15/0073 132/309 |

* cited by examiner

*Primary Examiner* — Rachel R Steitz

(57) ABSTRACT

A dental floss holder and flosser is provided. The flosser provides a reusable dental device for cleaning between the user's teeth. The flosser comprises a casing, a pair of tines, and a floss advancement reel. A bundle of floss resides within the casing. A length of dental floss from the bundle of floss is fed through the casing and into the floss advancement reel. The length of dental floss is wrapped around the floss advancement reel. The length of dental floss is then strung taut along the pair of tines, forming a fresh segment of dental floss. The remaining length is routed and wrapped back to the floss advancement reel. A user can then rotate the floss advancement reel such that the segment of dental floss is replaced and ready for the next use.

9 Claims, 11 Drawing Sheets

DENTAL FLOSS HOLDER AND FLOSSER

The current application claims a priority to the U.S. Provisional Patent application Ser. No. 62/811,084 filed on Feb. 27, 2019.

FIELD OF THE INVENTION

The present invention relates generally to dental cleaning devices. More specifically, the present invention relates to a dental floss holder and flosser device that provides a user with a fresh portion of floss in every use for dental flossing by rotating an innovative wheel and gear mechanism.

BACKGROUND OF THE INVENTION

It is widely recognized that brushing teeth twice a day and flossing daily constitute the basics of good oral hygiene. According to the American Dental Association (ADA), interdental cleaners such as floss are an essential part of taking care of teeth and gums for individuals. Cleaning between teeth removes plaque that can lead to cavities or gum disease from the areas where a toothbrush cannot reach. Interdental cleaning helps remove debris between teeth that can contribute to plaque buildup. Traditionally, floss picks and string floss are widely used for interdental cleaning.

A floss pick is easy to floss a user's teeth all the way in the back and has a pick that can be used to dislodge any large pieces of food stuck near the surface of teeth or gum. Floss picks, however, have drawbacks, one of which is redistributing bacteria. A floss pick is normally used for flossing over and over again with the same section of floss, resulting in transferring bacteria between different sections of the user's mouth. Additionally, most floss picks are made of plastic and single-use products, which may create waste and impact environment if a floss pick is trashed after each use. On the other hand, a standard string floss has the flexibility that allows the use to conform, bend, and wrap around the curves and other irregularities of the user's teeth. Additionally, the string floss can give the user a clean section of the floss for each tooth, thus preventing bacteria spreading from one area to another in the user's mouth. However, the string floss is difficult to use since handling a long piece of floss may be a hassle, especially for users such as young children and those with arthritis. Further, the string floss may be abrasive, causing irritation to sensitive gums and teeth.

Another type of flosser is a floss holder. Floss holders can make the flossing process easier and simpler, especially for users such as parents or caregivers in helping children and other individuals who need special care in cleaning their teeth. A dental floss holder is a dental care device that holds floss. Most floss holders include a "Y" shaped handle with two prongs spaced ¾ to one inch. Floss is held securely between the two prongs and the handle guides. These interdental flossing aides may also be called floss picks or floss threaders. Generally, floss picks are much shorter than floss holders and are sold in multi-packs, as these picks are usually designed to be used once and immediately discarded. Regardless of the name used, however, these devices allow for mess-free, one-handed flossing. Most floss holders are disposable and may have environmental impact when trashed after one use. Further, many existing floss holders include a knob or wheel on the holder for the user to wind an appropriate length of fresh string floss onto between the two prongs to replace used floss. However, it may require extra time and effort for the user to wind the string floss repeatedly and increase the waste of floss.

Thus, it is the objective of the present invention to provide a solution to the aforementioned problems and drawbacks. The dental floss holder and flosser of the present invention is a combination of string floss and floss pick. Specifically, the present invention provides a dental device for cleaning between the user's teeth as fast, simple, and efficient as possible. The dental floss holder and flosser of the present invention holds floss tight and keeps floss in place as the user reaches furthest area of the user's mouth. Additionally, the present invention significantly reduces the use of dental floss and minimizes waste by dispensing just enough fresh floss needed for each use of dental cleaning. Further, the dental floss holder and flosser of the present invention offers the user an efficient and reliable mechanism for reeling the pre-loaded floss spool with over 27 yards of break-resistant string floss, which provides the user with daily use of up to six months.

SUMMARY OF THE INVENTION

A dental floss holder and flosser is provided. The flosser provides a reusable dental device for cleaning between the user's teeth. The flosser comprises a casing, a pair of tines, and a floss advancement reel. A bundle of floss resides within the casing. A length of dental floss from the bundle of floss is fed through the casing and into the floss advancement reel. The length of dental floss is wrapped around the floss advancement reel. The length of dental floss is then stringed and taut along the pair of tines, forming a fresh segment of dental floss. The remaining length is routed and wrapped back to the floss advancement reel. A user can then rotate the floss advancement reel such that the segment of dental floss is replaced and ready for the next use.

The reel advancement mechanism further comprises an anti-reversal mechanism, such that the anti-reversal mechanism operatively engages the floss advancement reel, preventing the floss advancement reel from rotating in a specified angular direction. Additionally, the flosser further comprises a removably connected cap, allowing access to a floss chamber. The bundle of floss that resides in the flosser chamber can then be replaced with a fresh roll, allowing the reusable use of the flosser. In another embodiment, the cap further comprises a toothpick compartment, such that the cap can support and mount a deployable toothpick insert.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1-4, 8, and 10-11, the flosser 1 comprises a casing 14, a pair of tines 15, and a floss advancement reel 16. In the preferred embodiment of the present invention, the flosser 1 may take the form of a combination apparatus that combines a floss string dispenser with a floss stick. The present invention provides the user with a fast, simple, and efficient dental device for interdental cleaning. The flosser 1 holds floss tight and keeps floss in place at all times and as the user reaches the furthest area of the user's mouth. Additionally, the flosser 1 significantly reduces the use of dental floss and minimizes waste by dispensing just enough fresh floss needed for each use of dental cleaning, which minimizes environmental impact that conventional dental floss, picks, and holders may cause. Further, the flosser 1 offers the user with an efficient and reliable mechanism for reeling the pre-loaded floss spool with over 27 yards of break-resistant string floss, which provides the user with daily use of up to six months. In the preferred embodiment of the present invention, the flosser 1 is made out of any suitable material such as, but not limited to: polymer, stainless steel, aluminum, or any other suitable material.

Figure 3:
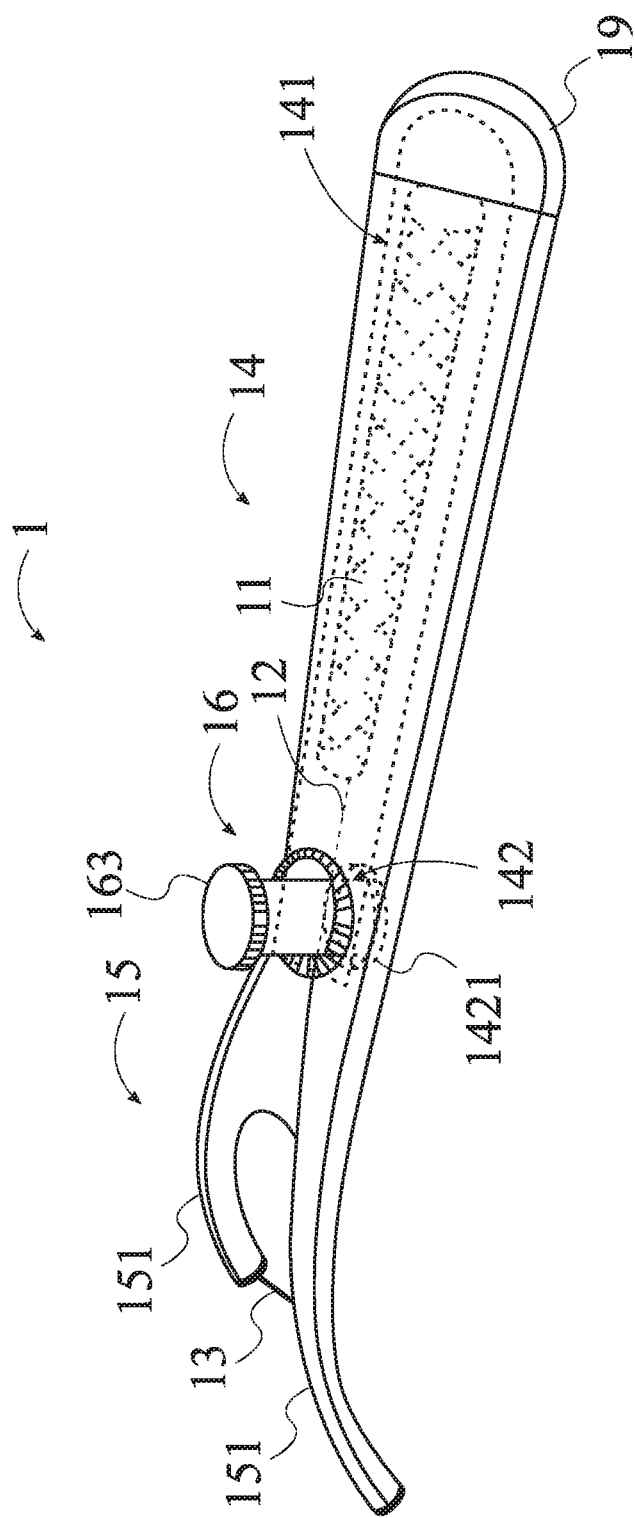
FIG. 3 is a top perspective view of the present invention.
Figure 4:
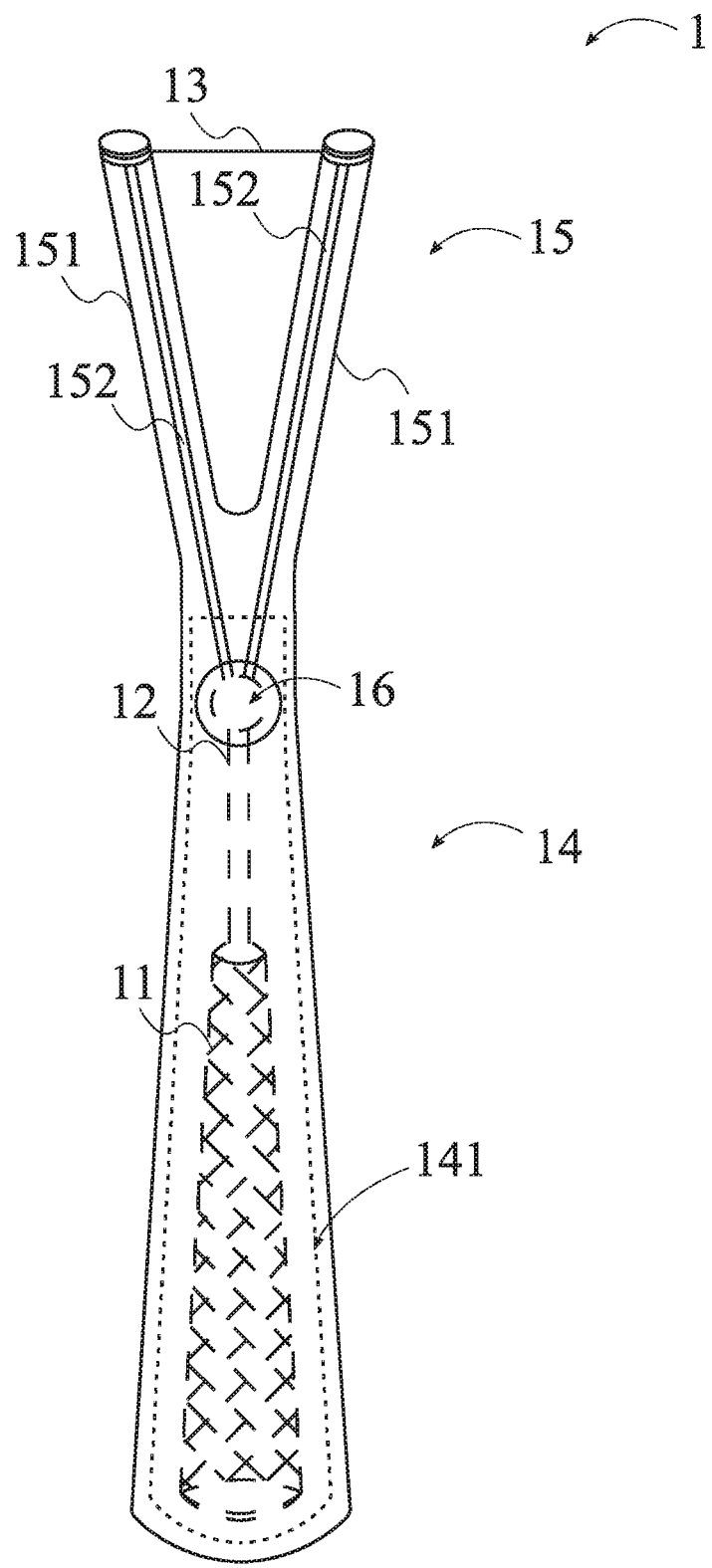
FIG. 4 is a front view of the present invention with hidden internal lines.
Figure 7:
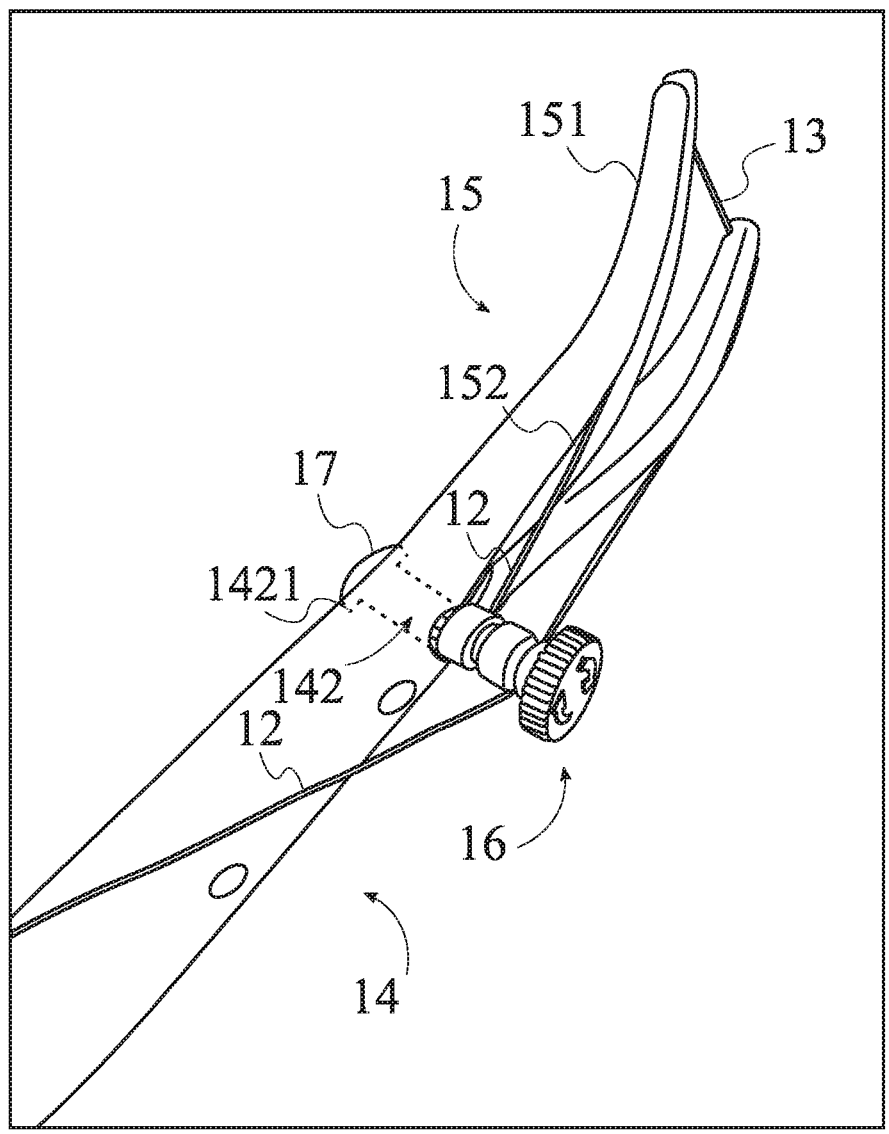
FIG. 7 is detailed view of a pair of tines used in the present invention.

In reference to FIGS. 3-4, and 7, the casing 14 comprises a floss chamber 141 and a reel aperture 142. In the preferred embodiment of the present invention, the casing 14 may take the form of a handle that provides the user with an efficient and convenient grip for dental flossing and reeling the floss for a fresh portion to be used for each flossing. In the preferred embodiment of the present invention, the casing 14 may take the form of any ergonomic shape.

The floss chamber 141 is positioned within the casing 14, as shown in FIGS. 3-4. The floss chamber 141 stores a bundle of floss 11 within the handle. In the preferred embodiment of the present invention, the bundle of floss 11 may take the form of a replaceable insert of dispensable floss, allowing the user to run a length of dental floss 12 through the reel aperture 142, to the floss advancement reel 16, to the pair of tines 15, and back to the floss advancement reel 16.

The reel aperture 142 traverses through the casing 14, as shown in FIGS. 3 and 7. In the preferred embodiment of the present invention, the reel aperture 142 serves as an access opening that facilitates the mounting of the floss advancement reel 16. Additionally, the reel aperture 142 allows the length of dental floss 12 to traverse outside of the casing 14, as shown in FIGS. 3-4.

In reference to FIGS. 1-4, 7-8, and 10-11, each of the pair of tines 15 comprises a tine body 151 and a floss channel 152. The pair of tines 15 is terminally connected to the casing 14, wherein the pair of tines 15 extends from the casing 14 to receive and support a segment of dental floss 13 extending between the pair of tines 15. In the preferred embodiment of the present invention, the tine body 151 may take the form of a Y-shaped floss holder that supports the segment of dental floss 13 between the pair of tines 15. In various embodiments, the pair of tines 15 may take the form of any shape, such as, but not limited to: U-shaped, arced, V-shaped or any other suitable shape.

Figure 1:
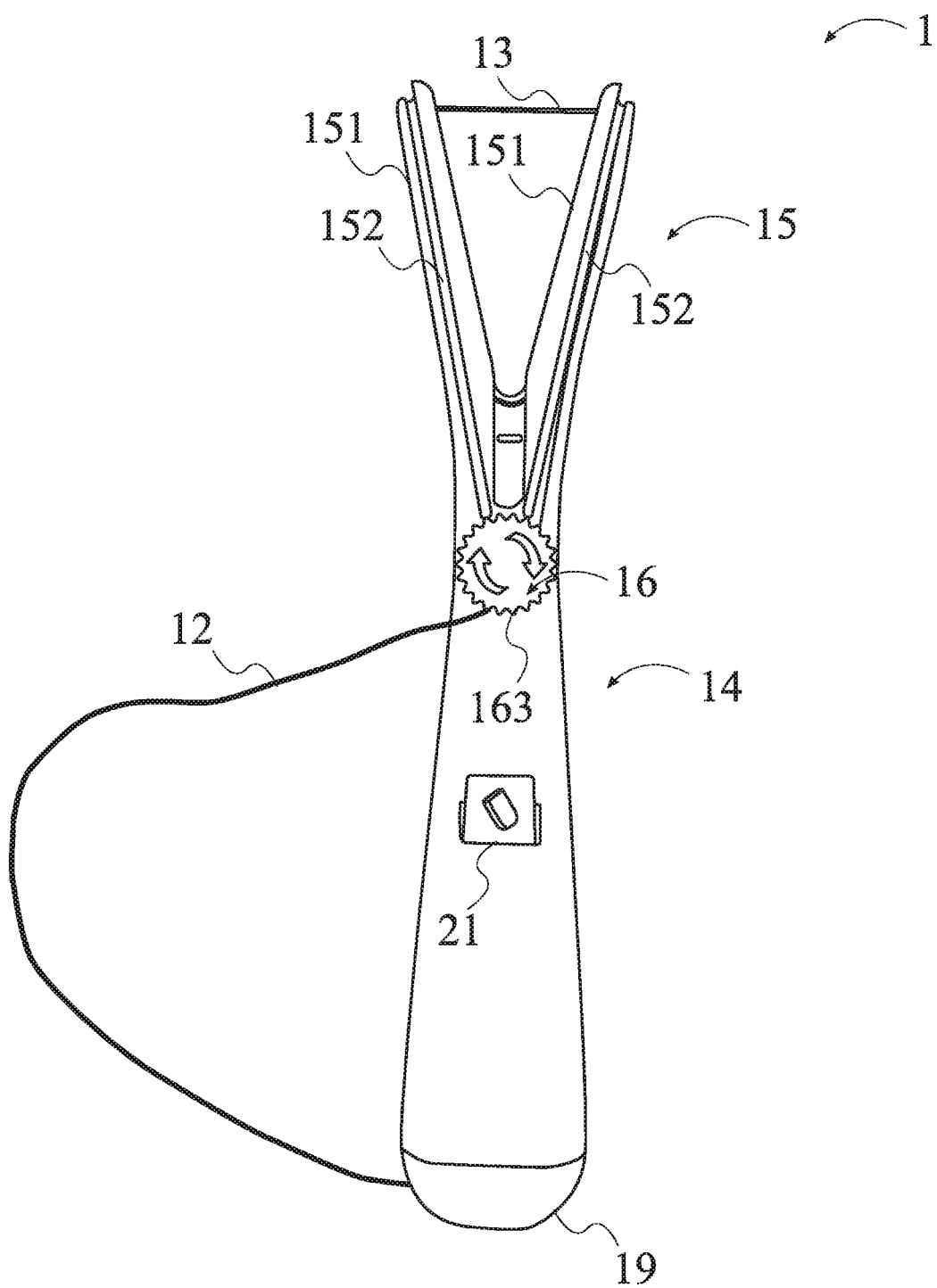
FIG. 1 is a front view of the present invention.

The floss channel 152 traverses along the tine body 151, as shown in FIG. 1. In the preferred embodiment of the present invention, the floss channel 152 provides an adequate path for the segment of dental floss 13 to be held between the pair of tines 15. In the preferred embodiment of the present invention, the floss channel 152 may take the form of a U-shape notch but may take the form of any other suitable shape.

The floss advancement reel 16 is rotatably connected within the reel aperture 142, as shown in FIGS. 1-4. In the preferred embodiment of the present invention, the floss advancement reel 16 may take the form of the floss advancement mechanism that provides the user to replace the segment of dental floss 13 between the pair of tines 15 with a fresh segment of dental floss 13.

Figure 5:
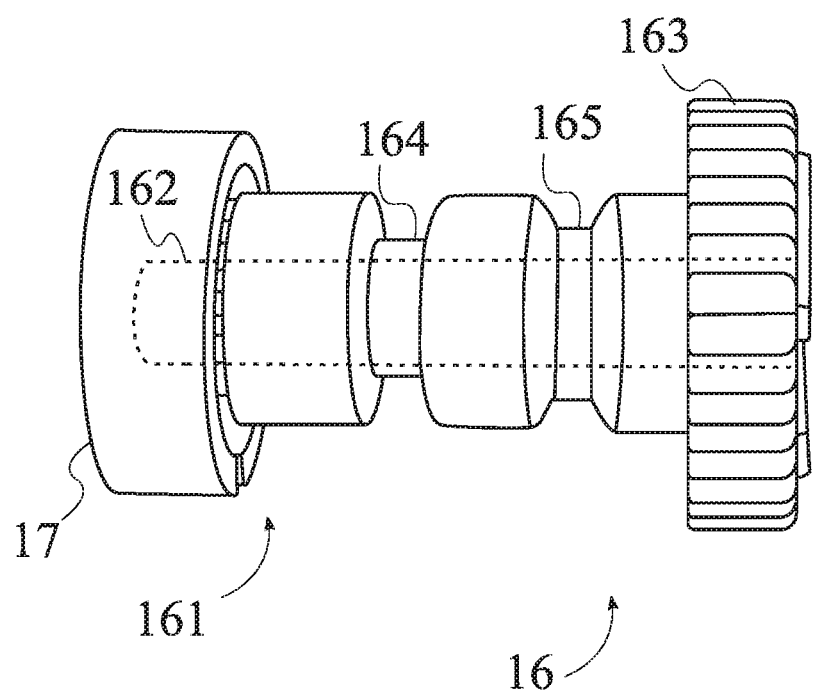
FIG. 5 is a side view illustrating an assembled floss advancement reel and reel bushing used in the present invention.
Figure 6:
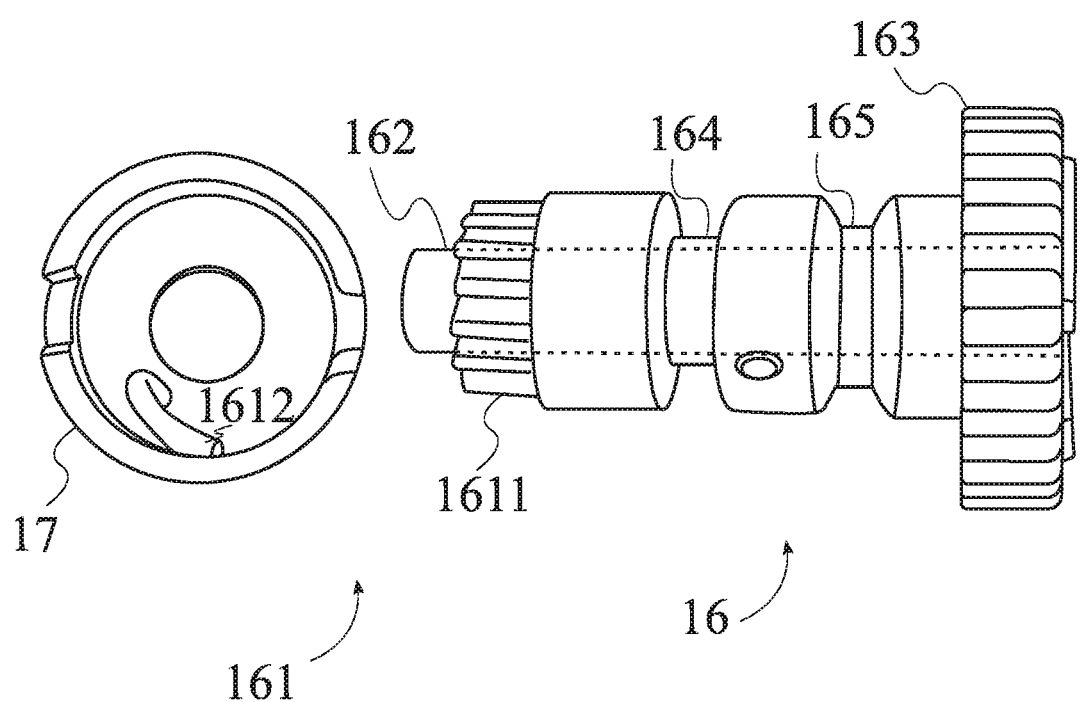
FIG. 6 is a side view illustrating a disassembled floss advancement reel and reel bushing used in the present invention.
Figure 9:
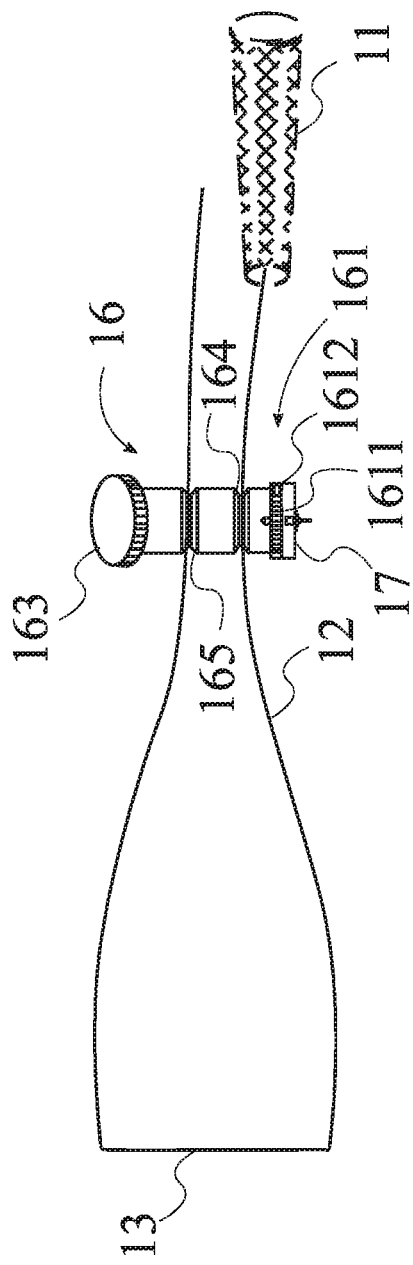
FIG. 9 is front view of the floss advancement mechanism routing a bundle of dental floss used in the present invention.

The floss advancement reel 16 comprises an anti-reversal mechanism 161, as shown in FIGS. 6 and 9. The anti-reversal mechanism 161 is operatively engaged to the floss advancement reel 16, wherein the anti-reversal mechanism 161 prevents the floss advancement reel 16 from rotating in a specified angular direction, as shown in FIGS. 5-6. In the preferred embodiment of the present invention, the anti-reversal mechanism 161 may take the form of a ratcheting mechanism that allows the floss advancement reel 16 to only rotate and turn in one angular direction. This allows uni-directional dispensing of dental floss, such that the fresh segment of dental floss 13 is dispensed between the pair of tines 15.

In the preferred embodiment of the present invention, the floss advancement reel 16 further comprises a spindle body 162, a knob 163, a first groove 164 and a second groove 165, as shown in FIGS. 5-6, and 9. The spindle body 162 is concentrically aligned with the reel aperture 142, as shown in FIGS. 3 and 7. The spindle body 162 functions as an axle of the floss advancement reel 16 that supports and mounts the rest of the components that constitute the floss advancement reel 16. The knob 163 is connected to the spindle body 162 opposite to the casing 14, as shown in FIGS. 5-6. This allows the user to unravel and remove the old floss from the floss advancement reel 16. In the preferred embodiment of the present invention, the knob 163 may take the form of a dial that provides the user with a means to rotate the floss advancement reel 16 along the reel aperture 142. The first groove 164 and the second groove 165 are positioned between the casing 14 and the knob 163, as shown in FIGS. 5-6. In the preferred embodiment of the present invention, the first groove 164 and the second groove 165 may take the form of floss string spool grooves that allows the user to wrap the length of dental floss 12 along one groove, such that it allows the length of dental floss 12 to route and feed along the floss channel 152. The traversed length of dental floss 12 along the floss channel 152 is then wrapped along the other groove, tensioning the length of dental floss 12 between the pair of tines 15.

Figure 2:
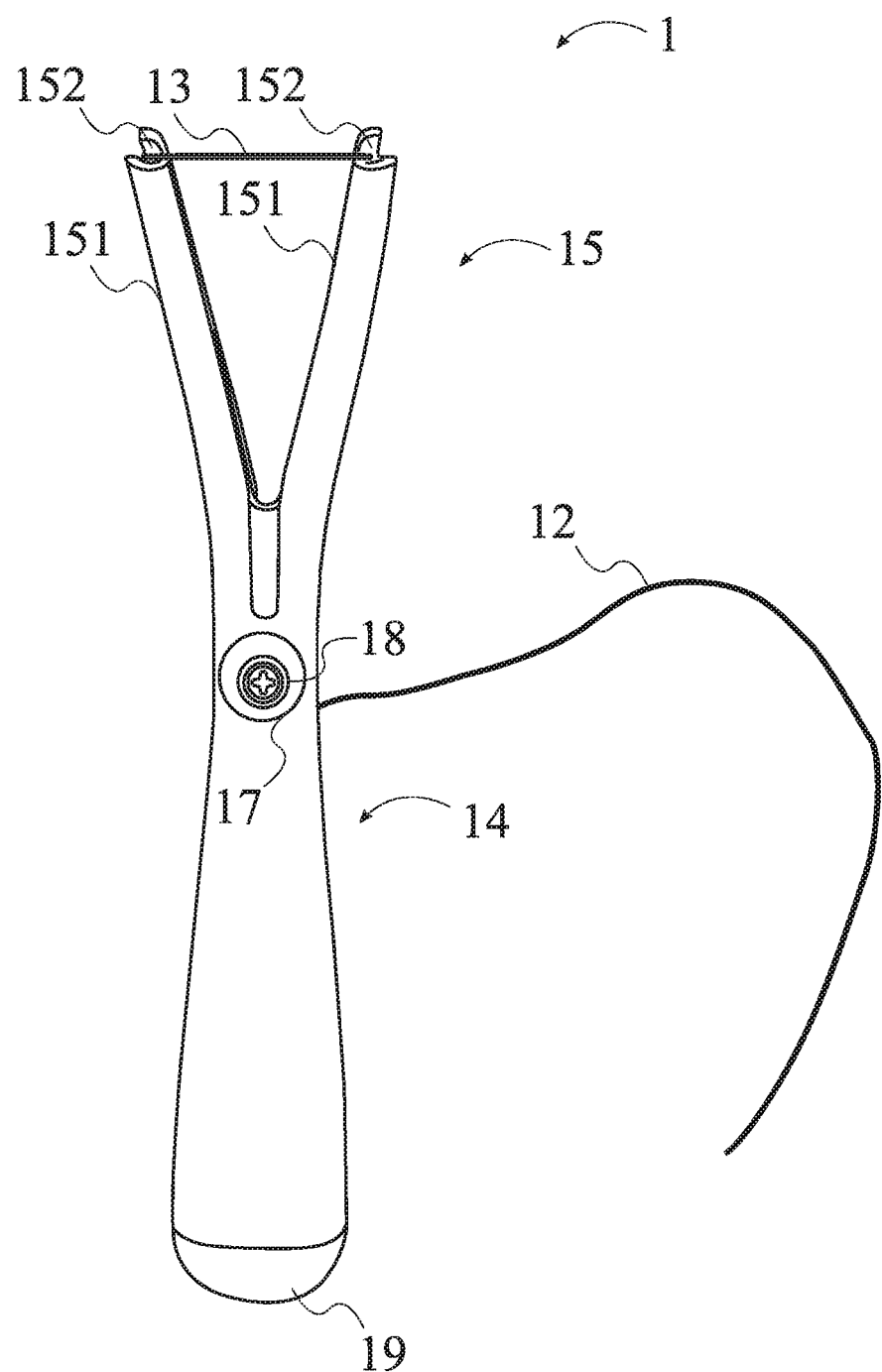
FIG. 2 is a rear view of the present invention.

The reel aperture 142 further comprises a reel anchor mounting end 1421, as shown in FIGS. 3 and 7. The flosser 1 further comprises a reel bushing 17, as shown in FIGS. 2 and 5-6. In the preferred embodiment of the present invention, the reel anchor mounting end 1421 facilitates the connection of the reel bushing 17 to the casing 14. The reel bushing 17 is connected to the reel aperture 142 adjacent to the reel anchor mounting end 1421, as shown in FIGS. 2 and 7. In the preferred embodiment of the present invention, the floss advancement reel 16 is rotatably connected to the reel bushing 17, as shown in FIGS. 5-6. In the preferred embodiment of the present invention, a screw fastener 18 removably attaches the floss advancement reel 16 to the reel bushing 17, as shown in FIG. 2.

In the preferred embodiment of the present invention, the anti-reversal mechanism 161 comprises a gear 1611 and a latch 1612, as shown in FIGS. 6 and 9. The gear 1611 is connected to the spindle body 162 opposite to the knob 163, as shown in FIGS. 5-6 and 9. The latch 1612 is connected adjacent to the reel bushing 17, as shown in FIGS. 6 and 9. The latch 1612 is operatively engaged with the gear 1611, as shown in FIG. 5, such that the floss advancement reel 16 is only allowed to turn in one angular direction. More specifically, the latch 1612 is positioned internally to the reel bushing 17, such that the latch 1612 engages the external gear 1611 teeth.

Figure 8:
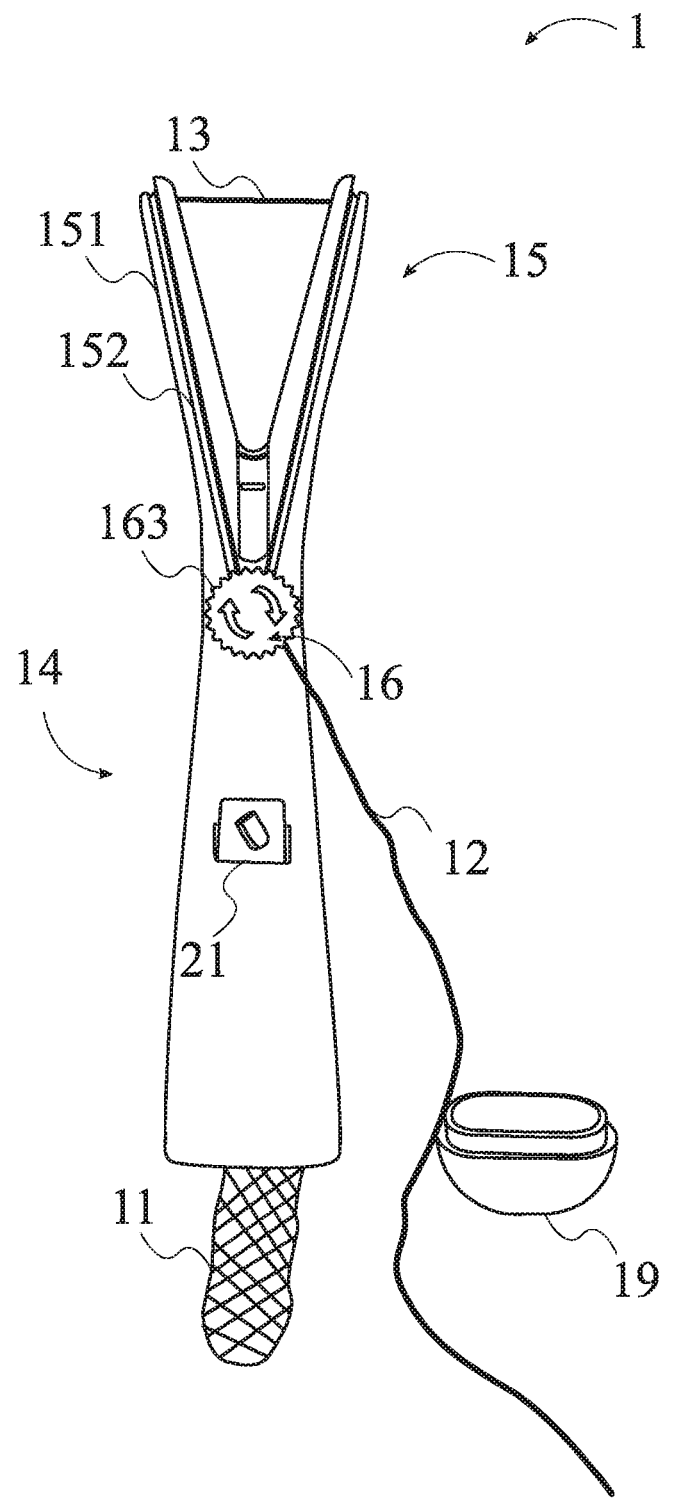
FIG. 8 is a front view of the present invention that shows a cap removed.
Figure 10:
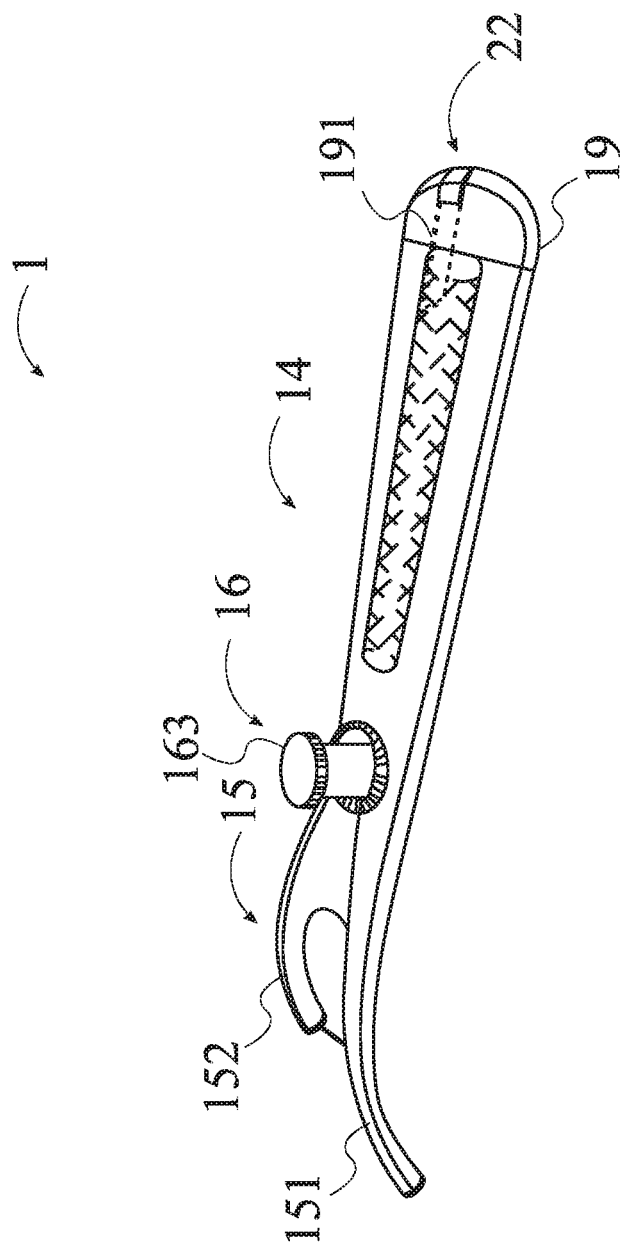
FIG. 10 is a top perspective view of the present invention, in accordance to another embodiment that shows a toothpick concealed within the cap.
Figure 11:
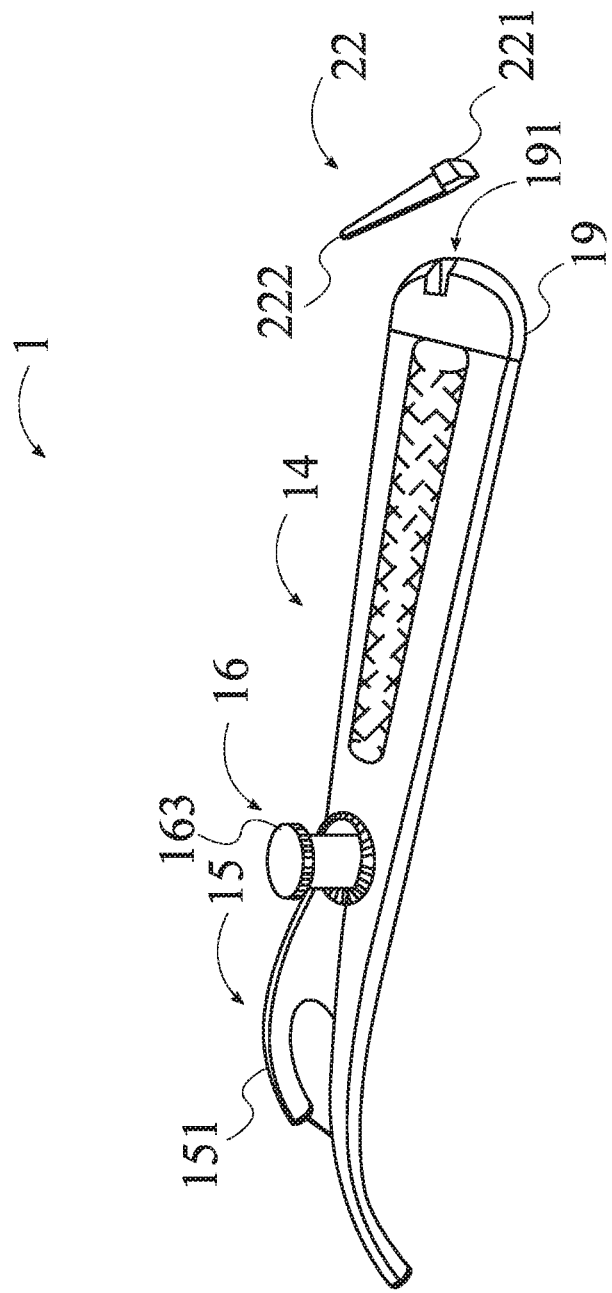
FIG. 11 is a top perspective view of the present invention, in accordance to another embodiment that shows a toothpick deployed from the cap.

The flosser 1 further comprises a cap 19, as shown in FIGS. 1-3, 8, and 10-11. In the preferred embodiment of the present invention, the cap 19 is removably connected adjacent to the floss chamber 141, as shown in FIG. 8. The cap 19 allows the user to access the floss chamber 141, facilitating the replacement and installment of the bundle of floss 11. In another embodiment, the cap 19 further comprises a toothpick compartment 191, as shown in FIGS. 10-11. The flosser 1 further comprises a toothpick insert 22, as shown in FIG. 11. The toothpick compartment 191 traverses into the cap 19, as shown in FIGS. 10-11. The toothpick insert 22 is removably positioned within the toothpick compartment 191, as shown in FIG. 10. The toothpick insert 22 provides the user with a deployable toothpick integrated along the cap 19 portion of the flosser 1. The toothpick insert 22 comprises a pull tab end 221 and a pick end 222, as shown in FIG. 11. The pick end 222 is positioned within the toothpick compartment 191, as shown in FIG. 10. The pull tab portion is positioned adjacent to the pick end 222, as shown in FIGS. 10-11. The pick end 222 of the toothpick insert 22 serves as the pointed end of the toothpick insert 22, allowing the user to pick their teeth using the pick end 222 of the toothpick insert 22. The pull tab end 221 of the toothpick insert 22 serves as the easily pull-able end of the toothpick insert 22 when the toothpick insert 22 is concealed within the toothpick compartment 191.

The flosser 1 further comprises a cutter 21, as shown in FIGS. 1 and 8. The cutter 21 is connected adjacent to the casing 14, as shown in FIGS. 1 and 8. In the preferred embodiment of the present invention, the cutter 21 provides a means of culling old length of dental floss 12 dispensed by the floss advancement reel 16. In the preferred embodiment of the present invention, the cutter 21 may take the form of a metal floss cutter 21 but can take the form of any other suitable floss string cutter 21.

Although the invention has been explained in relation to its preferred embodiment, it is to be understood that many other possible modifications and variations can be made without departing from the spirit and scope of the invention as hereinafter claimed.

What is claimed is:

1. A flosser comprising:
   a casing;
   a pair of tines;
   a floss advancement reel;
   the casing comprising a floss chamber and a reel aperture;
   each of the pair of tines comprising a tine body and a floss channel;
   the pair of tines being terminally connected to the casing, wherein the pair of tines extends from the casing to receive and support a length of dental floss extending between the pair of tines;
   the floss channel traversing along the tine body;
   the reel aperture traversing through the casing;
   the floss advancement reel being rotatably connected within the reel aperture;
   the floss chamber being positioned within the casing;
   the reel aperture further comprising a reel anchor mounting end;
   a reel bushing;
   the reel anchor mounting end being positioned opposite to a knob along the reel aperture;
   the reel bushing being connected to the reel aperture adjacent to the reel anchor mounting end; and
   the floss advancement reel being rotatably connected to the reel bushing.

2. The flosser as claimed in claim 1 comprising:
   The floss advancement reel comprising an anti-reversal mechanism; and
   the anti-reversal mechanism being operatively engaged to the floss advancement reel, wherein the anti-reversal mechanism prevents the floss advancement reel from rotating in a specified angular direction.

3. The flosser as claimed in claim 1 comprising:
   a cap; and
   the cap being removably attached adjacent to the floss chamber.

4. The flosser as claimed in claim 3 comprising:
   the cap further comprising a toothpick compartment; and
   the toothpick compartment traversing into the cap.

5. The flosser as claimed in claim 4 comprising:
   a toothpick insert; and
   the toothpick insert being removably positioned within the toothpick compartment.

6. The flosser as claimed in claim 5 comprising:
   the toothpick insert comprising a pull tab end and a pick end;
   the pick end being removably positioned within the toothpick compartment; and
   the pull tab portion being positioned adjacent to the pick end.

7. The flosser as claimed in claim 1 comprising:
   a cutter; and
   the cutter being connected adjacent to the casing.

8. The flosser as claimed in claim 1 comprising:
   the floss advancement reel comprising a spindle body, knob, a first groove and a second groove;
   the spindle body being concentrically aligned with the reel aperture;
   the knob being connected to the spindle body opposite to the casing; and
   the first groove and the second groove being positioned between the casing and the knob.

9. The flosser as claimed in claim 1 comprising:
the anti-reversal mechanism comprising a gear and a latch;
the gear being connected to a spindle body opposite to the knob;
the latch being connected adjacent to the reel bushing; and
the latch being operatively engaged with the gear.

\* \* \* \* \*